United States Patent [19]

Vecchiato

[11] 4,354,000
[45] Oct. 12, 1982

[54] RESILIENT PLASTIC WALL COATING FOR THE BUILDING INDUSTRY

[75] Inventor: Antonio Vecchiato, Treviso, Italy
[73] Assignee: Settef S.p.A., Treviso, Italy
[21] Appl. No.: 250,240
[22] Filed: Apr. 2, 1981
[30] Foreign Application Priority Data

Apr. 8, 1980 [IT] Italy .............................. 85546 A/80

[51] Int. Cl.$^3$ ................................................ C08K 5/05
[52] U.S. Cl. ..................................... 524/388; 524/386
[58] Field of Search .................... 260/29.6 H, 29.6 M, 260/29.6 E, 28.5 R, 28.5 A, 28.5 AV; 524/386, 388

[56] References Cited

U.S. PATENT DOCUMENTS 3,154,510  10/1964  Bryan et al. .................... 260/29.6 M
3,895,956   7/1975  Yoshida et al. ................ 260/29.6 M
4,059,551  11/1977  Weiant et al. .................. 260/29.6 H

*Primary Examiner*—Melvyn I. Marquis
*Attorney, Agent, or Firm*—Bucknam and Archer

[57] ABSTRACT

Plastic elastic wall coatings for the building industry for use on external and internal walls are described which comprise a paste of thermoplastic acrylic resins in the form of an emulsion of high content of solid materials, the solid materials being inert siliceous materials, carbonates, silicates, inorganic pigments, synthetic or mineral fibers, water repellent substances based on a wax or silicone derivatives and additives which are bactericidal agents, fungicidal agents and agents capable of causing the resin to set. The coatings exhibit high elasticity which is maintained with the passage of time and which permits to withstand great changes in temperature and variations in climate.

3 Claims, No Drawings

RESILIENT PLASTIC WALL COATING FOR THE BUILDING INDUSTRY

The present invention relates to the building industry and more specifically to plastic coatings for external and internal walls. Still more specifically, the wall coatings according to the present invention, in addition to exhibiting the usual properties of water tightness and resistance to erosion by the action of atmospheric agents, exhibit a great elasticity, a property which permits to withstand severe temperature changes which cause freezing and thawing.

It is well-known that a great number of different types of plastic wall coatings are available on the market in the form of a paste for internal or external use. They consist for the great part of resins diluted with water or with a variety of solvents and in addition to exhibiting some elasticity during the summer, they rigidify in winter time, so that as a result of a series of alternate freezing and thawing, they present cracks or crevices which in a short time cause the separation of the wall coatings. The resulting damage frequently is irreparable.

An object of the present invention is to provide a wall coating which exhibits a great elasticity no matter what the climate is so that it is possible to overcome serious changes in temperature and various cycles of freezing and subsequent thawing without causing any damage.

Another object of the present invention is to achieve a plastic wall coating which retains its properties of impermeability and surface adhesion to the supporting wall in spite of the changes in temperature.

The wall coating according to the present invention consists of a paste of thermoplastic resins in an acrylic emulsion with a high concentration of solid material, that is inert siliceous materials, carbonates, silicates, inorganic pigments, synthetic or mineral fibers, substances capable of repelling water having a wax base or silicone derivatives and additives such as bactericidal agents, fungicidal agents, and agents capable of forming a film of the resin material.

The presence of the synthetic or mineral fibers imparts to the coating, a high resistance to cracks due to traction and stresses.

The paste thus formed is applied by means of a brush or by spraying or by other suitable means to give a thickness of about 2 mm on every type of suitable wall surface. The coating of the present invention solves the problem of microcracks which occur in buildings, which sometimes are only transitory, but which occur with conventional commercial coatings. In fact, conventional coatings even if made of plastic material, are not capable of withstanding the transitory microcracks so that as a result, cracks and holes are found in the coating which permit infiltration of water. Obviously, these phenomena become particularly noticeable during periods of low temperature. The elasticity of the wall coating according to the present invention is at least ten times greater with respect to conventional plastic wall coatings currently used and a significant property of the plastic wall coatings according to the present invention is that their elasticity is retained with the passage of time, even if they are subjected to severe temperature changes causing freezing and thawing.

Fixed Required Components of the Coating According to the Present Invention

A dry resin in the minimum amount of 15%. The resin is an acrylic resin in an aqueous emulsion of concentration 46-55% by weight.

Synthetic or mineral fibers in the amount of a minimum of 0.3% for instance, fiberglass, nylon, acrylics, and PVC, (polyvinyl chloride).

Water repellents in a minimum amount of 0.3% for instance, waxes and silicones.

Additives: bactericidal and fungicidal agents in the minimum amount of 0.3%.

Additives capable of causing setting: a minimum amount of 0.5%, for instance, ethylene glycol, propylene glycol and derivatives.

Inert substances and pigments may be added in a variable amount depending upon the grade of coating desired and the type of aesthetic appearance one wishes to achieve.

Method of Preparation

The glycol, water and the additives are mixed together with the coloring pigment by means of an electrical or hydraulic dispersing apparatus. There is achieved a very fine and uniform dispersion. Then, the resin is added while the dispersing apparatus is still in operation. In a subsequent stage, the fiberglass or other fibers are added. Finally, the quartz sand and silica sand, calcium carbonates and/or kaolin are added. The product is a semi-dense paste, uniform and ready for use.

It is manifest that the plastic wall coatings according to the present invention offer substantial advantages because they permit application in the building industry even in very difficult climates and with great variations of temperature causing freezing and thawing without undergoing cracks or fissures which would cause serious damage to the building.

What is claimed is:

1. A plastic elastic wall coating for the building industry for use on external and internal walls which comprises a paste of at least 15% by weight of thermoplastic acrylic resins in the form of an aqueous emulsion of 46-55% concentration, said paste additionally containing solid materials, said solid materials being inert siliceous materials, carbonates and inorganic pigments, at least 0.3% of synthetic or mineral fibers which are a member selected from the group consisting of fiberglass fibers, nylon fibers, acrylic fibers, polyvinyl chloride fibers, at least 0.3% of a water-repellant substance which is a wax or a silicone compound, at least 0.3% of an additive which is a member selected from the group consisting of bactericidal agents and fungicidal agents and at least 0.5% of an agent capable of causing the resin to set, which is ethylene glycol or propylene glycol or derivatives thereof, the amount of the said solid material being sufficient to obtain a semi-dense paste, said coating exhibiting high elasticity and resistance to changes in temperature and variations in climate.

2. The composition, according to claim 1, which additionally contains coloring pigments.

3. The method of preparation of the plastic elastic wall coating, according to claim 2, which consists of mixing at least 0.3% of bactericidal and fungicidal agents, at least 0.5% of ethylene glycol, propylene glycol or derivatives thereof, at least 0.3% of a wax or a silicone compound, with water, until a very fine and uniform dispersion is achieved, adding under mixing at least 15% of an acrylic resin in an aqueous emulsion of concentration 46-55% by weight, adding at least 0.3% synthetic or mineral fibers which are a member selected from the group consisting of fiberglass fibers, nylon fibers, acrylic fibers and polyvinyl chloride fibers, then adding to the mixture a filler which is quartz sand, silica sand, calcium carbonate, kaolin or mixtures thereof, until a semi-dense uniform paste is obtained.

* * * * *